W. UMBDENSTOCK.
MACHINE FOR CASTELLATING NUTS.
APPLICATION FILED MAY 8, 1919.

1,395,169.

Patented Oct. 25, 1921.
5 SHEETS—SHEET 1.

INVENTOR
Walter Umbdenstock
By Henry Bleck
ATTORNEY.

W. UMBDENSTOCK.
MACHINE FOR CASTELLATING NUTS.
APPLICATION FILED MAY 8, 1919.

1,395,169.

Patented Oct. 25, 1921.
5 SHEETS—SHEET 3.

INVENTOR
Walter Umbdenstock.
By Henry Blech
ATTORNEY.

W. UMBDENSTOCK.
MACHINE FOR CASTELLATING NUTS.
APPLICATION FILED MAY 8, 1919.

1,395,169.

Patented Oct. 25, 1921.
5 SHEETS—SHEET 4.

INVENTOR
Walter Umbdenstock.
By Henry Bleck
ATTORNEY.

W. UMBDENSTOCK.
MACHINE FOR CASTELLATING NUTS.
APPLICATION FILED MAY 8, 1919.
1,395,169.
Patented Oct. 25, 1921.
5 SHEETS—SHEET 5.
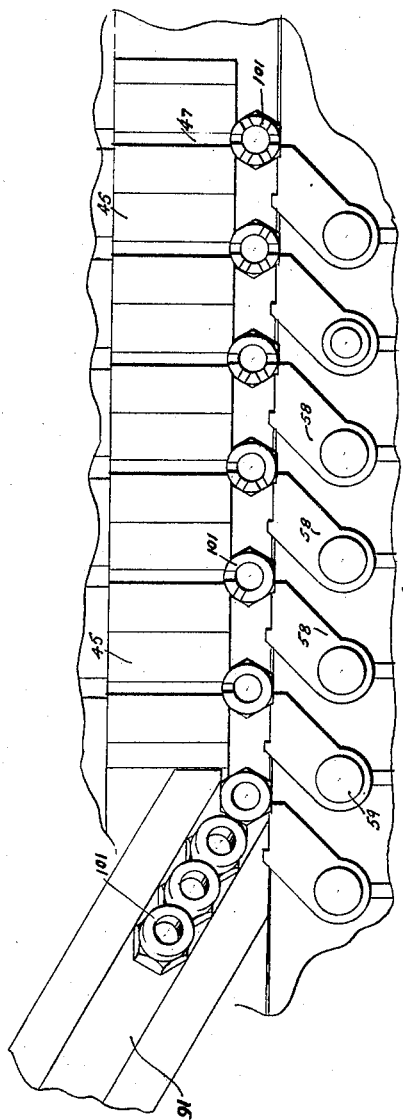
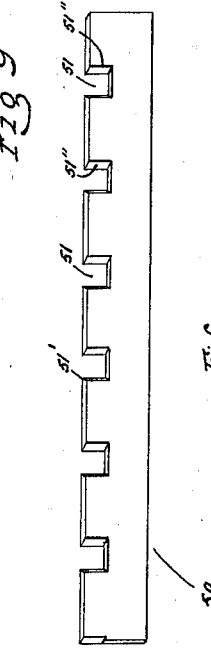
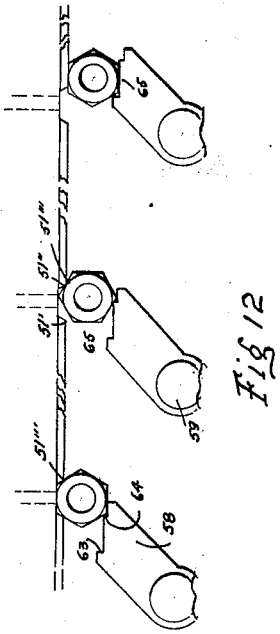
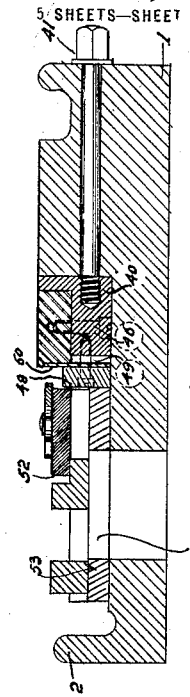
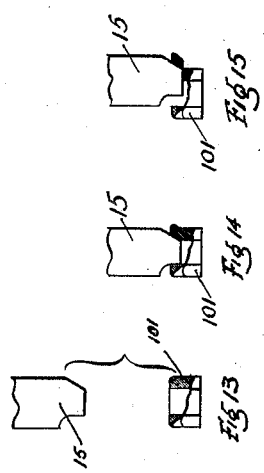
INVENTOR
Walter Umbdenstock
By Henry Heck
ATTORNEY.

UNITED STATES PATENT OFFICE.

WALTER UMBDENSTOCK, OF CHICAGO, ILLINOIS, ASSIGNOR TO THE HILL PUMP VALVE COMPANY, OF CHICAGO, ILLINOIS.

MACHINE FOR CASTELLATING NUTS.

1,395,169.  Specification of Letters Patent.  Patented Oct. 25, 1921.

Application filed May 8, 1919. Serial No. 295,689.

*To all whom it may concern:*

Be it known that I, WALTER UMBDENSTOCK, a citizen of the United States, residing at 2307 Archer avenue, Chicago, Illinois, c/o The Hill Pump Valve Company, have invented certain new and useful Improvements in a Machine for Castellating Nuts, of which the following is a specification.

The invention relates to machines for castellating nuts. The art of castellating nuts has attracted the attention of many inventors who endeavored to produce a machine which would castellate nuts at high speed and enable the various phases of operation to be obtained automatically so as to reduce the supervision of the machine, the necessity of tending to the same, the frequency of exchange of worn parts, and the possible failure of slotting the wall of the blank nuts correctly to a desired minimum. While undoubtedly the art in this respect has been advanced to a marked degree, yet as far as is known the machines hitherto perfected lacked that simplicity of construction, that efficiency of operation, and that reliability of performance which are requisite to pronounce a machine a complete success from a technical and commercial standpoint.

It therefore constitutes the principal object of the invention to provide a nut castellating machine which is adapted to meet the most stringent requirements made with respect to machines of this character, whereby a wholesale production of castellated nuts can be obtained not possible with the machines hitherto perfected.

A further object of the invention entails the provision of a machine where from a chute the nut blanks are fed to the machine, conveyed through the path assigned thereto, indexed to present continuously new wall portions to the punch, slotted, and finally discharged. All these phases of operation may be obtained in an entirely automatic manner and independent of the supervision and control of the operator.

A further object of the invention constitutes the fact that the nut blanks are maintained with the longitudinal axis vertically, or, in other words, are arranged in upright position throughout the feeding, indexing and slotting operations, so that the nuts have a comparatively large contact surface in engagement with the bearing plate and are in staple arrangement conducive to proper working conditions.

It is a further object of the invention to maintain the nut blanks in upright position without the employment of pins or other elements entering the center bore of the nut blanks and which obtain an absolutely secure holding of the nut blanks during punching to preclude faulty or defective slotting.

A further object aims at the provision of a punch which vertically reciprocating is adapted to enter the center bore of the nut blank and slot the blank walls from the center outwardly.

A further object constitutes the provision of a punch movably secured to a punch block and adapted to execute a movement relative to said punch block at a predetermined position, whereby the nut blank wall is slotted from the center bore outwardly.

The invention has for a further object the provision of indexing means which also have the function of conveying means, whereby a nut blank is successively indexed and advanced in proper relation to a series of punches which thus produce a series of slots in the nut blank wall at equal circumferential distances.

A further object entails the provision of means for securely holding the nuts against displacement during the punching operation.

It is also an object of the invention to control said nut holding means by the punch so as to insure correctly timed actuation of said nut holding means.

A further object of the invention embraces the provision of stationary guiding means coacting with said indexing means to permit rotation of the nuts at predetermined positions and advancement of the nuts to a predetermined distance.

The invention has for another object the provision of automatic safety means whereby the operation of the machine is rendered idle when the nut blanks are in improper position.

A further object of the invention entails the prevention of movement of the indexing and conveying means when the nuts do not occupy a correct position.

A still further object aims at the provision of means for preventing the punch from executing a complete working stroke when the nuts are improperly arranged.

It is also an object of the invention to provide certain features of construction, arrangement and coöperation of parts tending to increase the usefulness, efficiency, reliability and desirability of a machine of this character.

To the accomplishment of the foregoing and related ends, the invention then consists of the means hereinafter fully described and particularly pointed out in the claims; the annexed drawings and the following descripting setting forth in detail certain mechanism embodying the invention which, however, constitute but one of the various ways in which the principle of the invention may be used.

In said drawings:

Fig. 8 is a perspective view of a die;

Fig. 9 is a fragmentary plan view of the indexing and conveying means and associated parts to an enlarged scale;

Fig. 10 is a perspective view of a recessed plate coacting with the indexing means;

Fig. 11 is a transverse section on the line 11—11 of Fig. 2;

Fig. 12 is a diagrammatic representation to illustrate the indexing of nut blanks, and Figs. 13–15 illustrate the operation of the punch.

Figure 1:
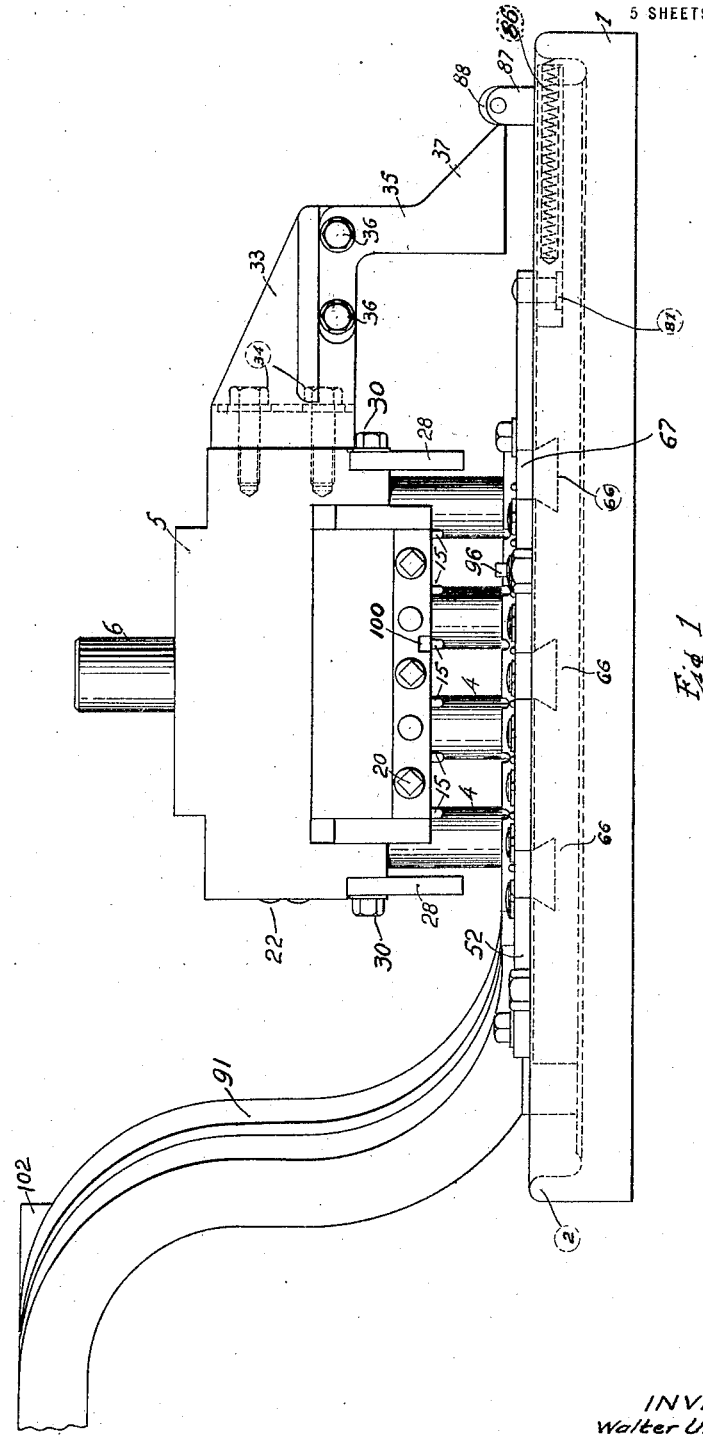
Figure 1 is a front view of the machine constructed in accordance with my invention.

The invention, briefly described, comprises means for conveying nut blanks successively through a path assigned thereto in upright position, means for indexing said nut blanks, and the provision of vertically reciprocating punches for slotting the nut blanks from the center bore outwardly.

Referring to the several figures of the drawings, 1 generally designates a die shoe of substantially oblong construction, formed with a vertical flange 2 along its perimeter and equipped with a raised portion 3, at the center to one side thereof, having a plurality of upright pins 4, which act as guide pins for the punch block, generally designated by 5. The punch block 5 is equipped with a shank 6, whereby it is secured to the ram or other reciprocating element of the punch press, and is constructed hollow, as particularly indicated in Fig. 5, for a purpose presently to be described.

The punch block is formed with apertures 7 to receive the upright pins 4, of which four are provided, as indicated in the several views of the drawings. The punch block 5 is adapted to movably carry the punch holder and to this end the top at the interior of the punch block is provided with seats 8 and 9 to receive the rounded ends of links 10 and 11, which are respectively articulated with the punch block and with the punch holder, generally designated by 12.

The punch holder 12 comprises a block 13, which has a rectangular groove 14 at the bottom extending throughout the length of the block 13 and adapted to receive a plurality of blocks between which the punches 15 are received. As indicated in the bottom plan view, the groove 14 receives three blocks 16, having flanges 17 at one end and two blocks 18, which abut the flanges 17 so as to define a rectangular narrow space for the reception of the punches 15. As indicated, six spaces are formed for the reception of six punches, and rectangular end plates 19 are secured to the block 13 in order to hold the smaller blocks 16 and 18, and therewith the punches, against endwise movement.

Bolts 20 are threaded at one side through the body block 13 of the punch holder and enter the holding blocks 16 in threaded engagement therewith. Bolts 21 are arranged between the bolts 20 and extend through the body block 13 and the holding block 18, to maintain the parts in place. The links 10 and 11 which are articulated with the punch block 5 by means of bolts 22, are also pivotally secured to the end plates 19 by bolts 23, the body block 13 being recessed at the upper side to permit a parallel motion of the punch holder 12 with respect to the body block 5.

Figure 5:
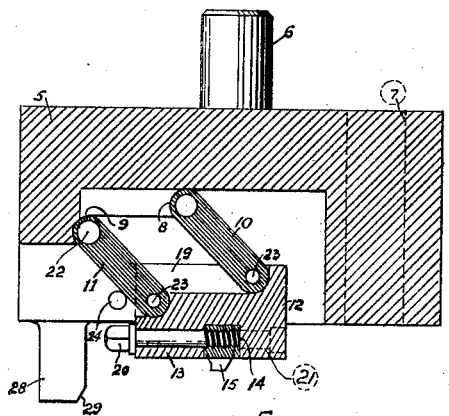
Fig. 5 is a section on the line 5—5 of Fig. 4.
Figure 6:
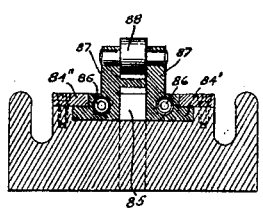
Fig. 6 is a section on the line 6—6 of Fig. 2.

As indicated in Fig. 5, a pin 24, protruding from the side wall of the punch block 5, maintains the link 11, and therewith the link 10, in a slanting position, such that upon the descent of the punch, as will be hereinafter further explained, an abutment acting on the punch holder 12 will cause the latter to execute a horizontal movement while the punch block continues its descending stroke. The punch block is recessed at each side, as at 26, to receive a plate 27 having a depending arm 28 which at its rear end is slightly beveled, as at 29, for a purpose hereinafter further specified.

Figure 4:
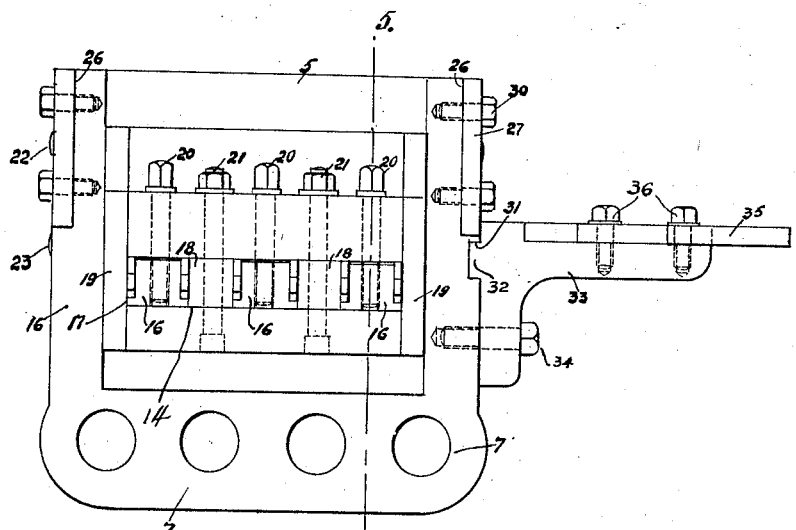
Fig. 4 is a bottom plan view of the punch block and the punch holder.

The plate 27 is secured to the punch block 5 by a pair of screws 30, the plate having slots to provide for adjustment as may be necessary in the course of operation of the machine. The punch block 5 is also equipped at the right hand side, as viewed in Fig. 4, with a vertical groove 31 to receive therein a ledge 32 of an angular bracket 33, one leg of said bracket being secured to the punch block by a pair of screws 34 while the other leg of the bracket carries a cam member 35, which is secured to said bracket 33 by a pair of screws 36. As is indicated in Fig. 1, the cam member 35 has a cam edge 37 which serves for the actuation of the indexing means, whereby the latter may execute a reciprocating movement as will be hereinafter further explained.

The central raised portion 3 of the die shoe 1 is formed with a plurality of semi-circular recesses 38 at its front side which extend downwardly to the bottom of the die shoe and open there in to a circular bore 39 serving as a discharge throat for slugs cut from the nut blanks, as will be hereinafter explained. The central portion 3 of the die shoe has a flat front face against which an angular member 40 is placed which is maintained in position with respect to the die shoe by a plurality of through-bolts 41, extending through the flange 2 and raised portion 3 of the die shoe and threaded into the angular member 40.

Figure 2:
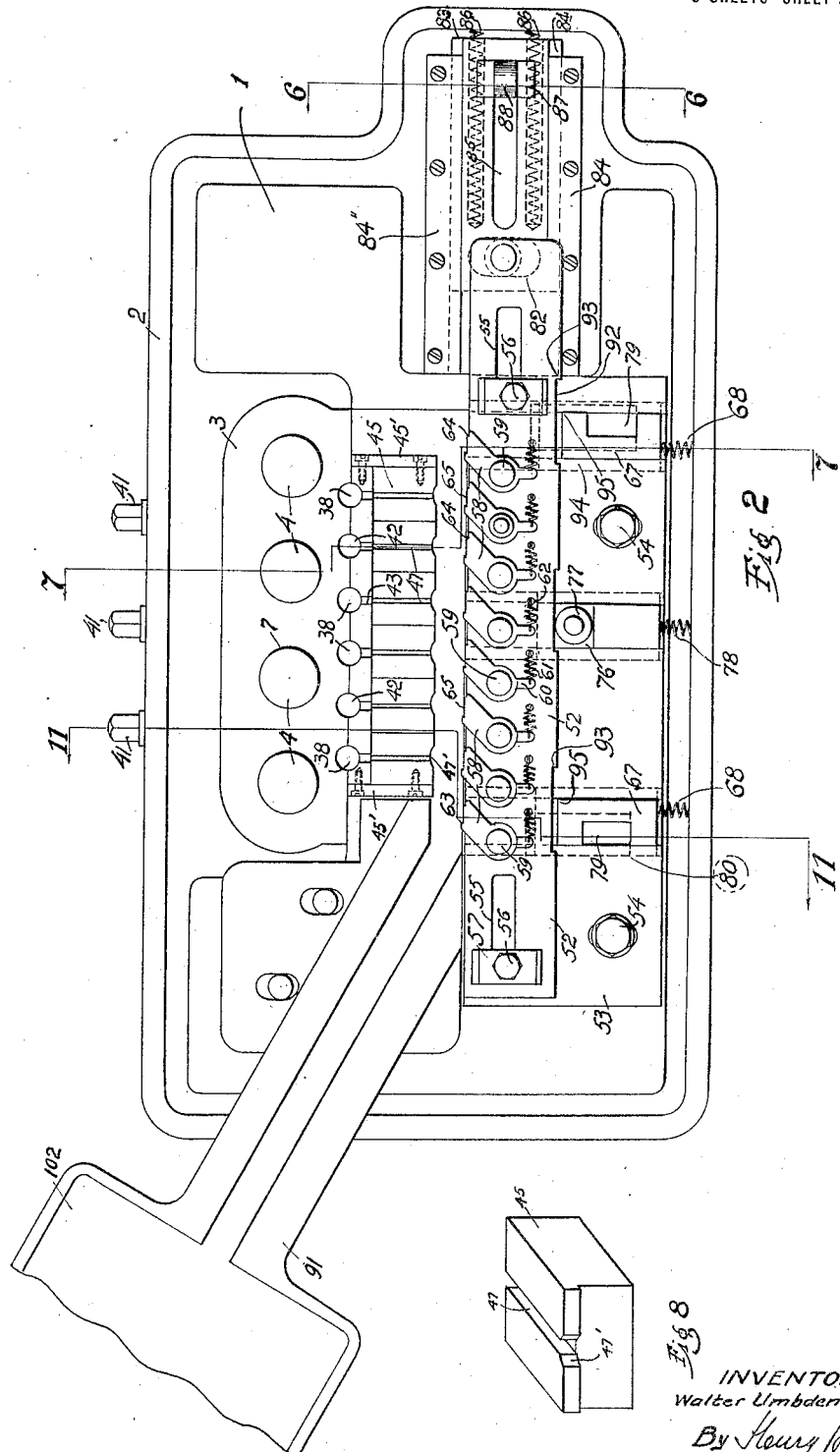
Fig. 2 is a top plan view of the lower part of the machine with the punch holder and associated parts removed.
Figure 3:
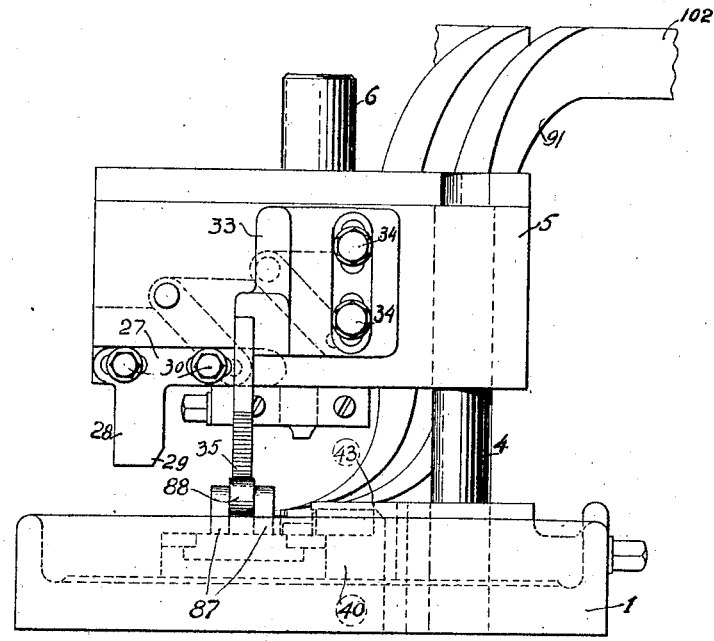
Fig. 3 is a side view of the machine.

As indicated in Figs. 2 and 11, the angular member 40 at the side abutting the central portion 3 of the die shoe is provided with a vertical semi-circular bore 42 which, at the upper end, opens into a narrow slot 43 having an inclined bottom 44. The angular member 40 serves as a support for a plurality of dies 45, one of which is indicated in perspective in Fig. 8, and which project a distance beyond the forward edge of the angular member 40. The dies are secured to the angular member by a plurality of upright screws 46. The dies 45 have a central groove 47 narrower than the groove 43 of the angular member 40 but in line therewith. At the front edge of the die a circular cutout 47' is provided at the end of the groove 47 to provide the necessary clearing for the rotation of the nut blanks in the course of operation. End plates 45' are secured to the angular member and hold the dies in position thereon. At a suitable distance from the angular member 40, a bearing member 48 is provided maintained in spaced relation to the angular member 40 by a plurality of screws 49. The side facing the angular member is provided with a rabbet in which is arranged a recessed member 50, shown perspectively in Fig. 10, which is a flat plate with a plurality of rectangular grooves or recesses 51 spaced a distance equal to the distance of the centers of the dies 45. The edges 51' and 51" of the plate are beveled to an angle equal to the angle formed by one side of a nut blank to the other.

From the foregoing it is obvious that a nut blank arranged on the bearing member 48 and arranged in line with the center of the die 45, by virtue of the recess 47' at the front of the die and the recess 51 of the member 50, has sufficient space to be arranged so that one side of the nut blank is flush with the rear side of the recessed member 50 while the adjacent sides contact with the beveled edges 51' and 51" respectively.

The mechanism for indexing nut blanks comprises a rectangular plate 52, termed the indexing plate, which is arranged on an anchor plate 53, secured by bolts 54 to the die shoe. The indexing plate has longitudinal slots 55 through which extend bolts 56 which enter the die shoe. Attention is called to the fact that the plate is normally in that position in which the front edge of the slot has a slight distance from the front side of the bolts 56. Holding members 57 arranged on the index plate and retained by the bolts 56 prevent the raising of the plate from the anchor plate, but permit reciprocation of the index plate both longitudinally and transversely of the die. The index plate 52 is provided with a plurality of pawls 58 which are pivotally secured to the plate by headed pins 59. Each pawl is formed integral with a forwardly extending finger 60 connected by a spring 61 to a pin 62 secured to the index plate. The operative portion of the pawl extends in slanting direction rearwardly and is formed with two shoulders 63 and 64. When, for instance, the index bar 52 is forced to the lefthand side, the projecting shoulders 63 of the pawls will be depressed by a corner of the nut blank forwardly so as to permit the movement of the index bar toward the left hand side, as viewed in Fig. 2. Upon the subsequent return movement, however, of the index bar, the shoulder 64 will engage the adjacent corner of a nut blank and will impart thereto a rotation about the vertical edge 51" of the member 50 as pivot until the side of nut blank will abut the edge 65 of the pawl and the opposite side of the nut blank is in engagement with the front face of the recess member 50. The shoulder 63 of the pawl, in the continued right hand movement of the index bar, will then carry along the nut blank to the extent of the return movement of said bar, and at the end of the movement the nut blank will be partly received in the succeeding groove 51, in which one side of the nut blank is again flush with the rear face of the member 50 and the adjacent sides are in engagement with the beveled edges 51' and 51".

Figure 7:
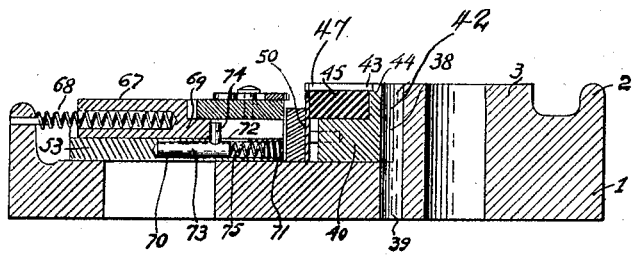
Fig. 7 is a section on the line 7—7 of Fig. 2.

The anchor plate 53 is provided with a plurality of dove-tailed grooves 66, preferably three, the two outer ones of which each receive a slide block 67, which is formed to fit within the dove-tailed groove 66 and has a portion extending thereabove. The block is provided with a bore open at the forward end for the reception of a spring 68, whereby the slide block 67 is forced to a position adjacent to the index bar. As shown in Fig. 7, the slide block 67 has an extension 69 adapted to underlie a portion of the index bar. The anchor plate 53 is provided with a horizontal bore 70, which opens toward the rear side of the plate and is closed there by a plug screw 71. A slot 72, of appropriate length, communicates with said bore, in which a horizontal pin 73 is arranged, which is provided with a vertical pin 74, constituting a stop pin to limit the advance of the slide block toward the rear side under the action of the spring 68. A spring 75, interposed between the plug screw 71 and the pin 73, holds the latter in the left hand position as viewed in Fig. 7.

It is obvious that when pressure is exerted upon the slide block 67 in addition to the pressure exerted by the spring 68, the tension of the spring 75 can be overcome and the slide block 67 will then, in its movement toward the rear of the machine, engage the index plates 52 and force the same into engagement with the nut blanks to hold the same securely in place while the punching operation is being performed. The construction of the slide block and the associated parts is identical for the two outer slide blocks, so that the description of one will suffice for both parts.

Intermediate the slide blocks 67, a small block 76 is provided in the dove-tailed groove 66, which carries a roller 77 in engagement with the index bar, the block 76 being held in the proper position by a spring 78, interposed between the flange 2 of the die shoe and the block 76. The slide blocks 67 are each provided at the center with a cutout 79, which coincides with an aperture 80, arranged in the anchor plate 53, and is in registry with a similar aperture in the die shoe. The right hand end of the index bar carries at its lower side a roller 81, which is arranged within a transverse slot 82 of a reciprocating member, generally designated by 83. The latter comprises a base plate 84, equipped at the center with a longitudinal slot 85, and is formed with ledges 84', adapted to slide in a raceway with which the die shoe is equipped. Holding members 84" confine the ledges in the raceway.

The base plate 84 is equipped with two ports symmetrically arranged with respect to the longitudinal center and opening at the outer end thereof to house springs 86, which abut against the flange 2 of the die shoe. The base plate is furthermore equipped with two standards 87 between which a roller 88 is journaled, which is adapted to coact with the cam 37 of the member 35.

The path of the nut blanks 101 is defined by the recessed member 50 at one side and the indexing bar 52 at the other side forms the horizontal continuation of a curved raceway provided in a chute 91, which terminates at the upper end in a horizontal pan 102. The nut blanks 101 indiscriminately arranged on the pan are pushed into the raceway of the chute, which by reason of its double curvature imparts to the nut blanks the necessary momentum to reach the horizontal path between members 50 and 52 and there to be conveyed to the series of punches 15 to be successively operated on.

The operation of the machine is as follows: Upon the nut blanks 101 reaching the path between the dies and the index bar, by virtue of gravity, the punch block is then reciprocated. The descending movement of the punch block will cause the cam 35 to descend, thus presenting the inclined edge 37 to the roller so that the springs 86 may expand and force the member 83 toward the left hand side, in which movement, by virtue of the interengagement of the member 83 and the index bar 52 by the roller 81, the index bar will participate. The pawls 58, in the left hand movement of the index bar, will be depressed by the nut blank arranged in the path assigned for the same so as not to present any obstacles toward this movement of the index bar.

Upon the continued descent of the punch block, the members 28 will enter the cut-outs 79 of the slide blocks 67 and will enter the apertures 80 of the anchor plate and the die shoe, at which time, however, the cam portion 29 of the member 28 will cause the slide blocks to be shifted toward the rear side of the machine, and in this movement will engage the index bar to be bodily moved toward the rear of the machine, so that the nut blanks arranged in the path between the die and the index bar will be held securely in position. The slight transverse movement of the index bar rearwadly is possible by virtue of the fact that the front edge of the slots 55 normally is at a slight distance from the bolts 56. The descending movement of the punch block continues until the punch 15 enters the center bore of the nut blank arranged in alinement with the longitudinal center of the die, and as the punch carrier will now enter into engagement with the dies 45 which constitute abutments, it is prevented from continuing the descending movement together with the punch block, but by virtue of the arrangement of the links 10 and 11 can only move in horizontal direction rearwardly, so that the punch 15 is forced to move from the center bore of the nut blank through the wall thereof, cutting therefrom a slug corresponding to the slot punched, said slug being conveyed by the horizontal movement of the punch 15 through the groove 47 to the inclined groove 43, where, by virtue of the inclined bottom 44, it falls into the circular bore 39 of the die shoe, where it is automatically discharged.

The upward movement of the punch releases the engagement of the members 28 and the slide blocks 67, so that the latter may, under the action of the spring 75 and the pin 74, move toward the front of the machine. The ascending movement of the punch block and therewith of the cam member 35 will force the roller 88, which is at the extreme left position, to return to the right end position, and in this movement the slide member 83 and the index bar 52 are forced toward the right hand side. Upon the movement of the index bar together with its pawls toward the right hand side, the shoulders 64 of the pawls 58 engage a corner of a nut blank 101 and turn the same, so that a side of the nut abuts against the edge 65 of the pawl, whereby the succeeding corner of the nut blank is caught by the shoulder 63 of the pawl. Thus the return movement of the index bar forces a nut blank from the position occupied during the punching operation to the next position which is in line with the center line of the succeeding die.

In Fig. 12 the turning of a nut blank is diagrammatically indicated. The nut blank, as explained hereinbefore, travels successively from one groove of the recessed member 50 to the next one, and at each groove it is partly received therein, so that one side is flush with the rear face of the member 50 and the adjacent sides engage the edges 51′ and 51″. The turning of the nuts about the edge 51‴ entails the entrance of the entire nut between the member 50 and the index bar, with the result that as the nut travels or advances from one groove 51 to the next, the index bar has a distance from the member 50 which is larger than the normal distance therefrom, i. e., when the nuts are partly received in the grooves 51.

Previous to the shifted advancing of the nut from one position to the succeeding one, it is turned throughout an angle of 60°, so that, after having passed all six dies and the punches coöperating therewith, six partial rotations have been imparted to a nut blank so as to obtain six slots spaced 60° apart in a nut blank. The index bar thus is moved through a closed path comprising the left hand longitudinal movement at a normal distance from the member 50, a slight transverse movement away from the member 50 to enable the turning nuts to completely enter between member 50 and the index bar, and a long return movement of the index bar, at a distance from the member 50 equal to the distance of two opposite sides of a nut blank, and when reaching the original position the index bar, under the action of the spring 78, moves transversely toward the member 50 to force the nuts into the new grooves 51, before which the nut blanks are situated at the end of the return movement.

In order to prevent the improper slotting of nuts when a nut blank is not properly located in the path, i. e., when the nut blank is arranged not in alinement with the longitudinal center of the die and thus partly received in a recess 51, the index bar is provided with recesses 92 so as to provide shoulders 93, which in the normal position of the index bar clear the edge 94 of the slide block. If, however, a nut is accidentally arranged between the grooves 51 of the recess member 50 so as to keep the index bar farther spaced from the member 50 than if the nuts were partly received in the grooves 51, i. e., in the case when a nut blank occupies an improper position, the shoulder 93 will then engage the corner 95 of the slide block 67 and will prevent further movement of the index bar. In other words, the reciprocation of the index bar is shortened so as not to permit any indexing or conveying of the nut blanks. As an additional safety means, one of the headed pins 59 of the pawls is provided with an upright pin 96, which is adapted, when the index bar occupies its left hand end position, to register with the depression 100 in the punch holder. If, however, the index bar has not completed its movement by virtue of an improperly located nut blank, then the descending punch block, not having its depression 100 in registry with the pin 96 by reason of the shortened reciprocation of the latter, is prevented from continuing the descending movement and will be held clear of the nut blanks so as not to execute the punching operation.

The provision of maintaining the nut blanks throughout their feeding and slotting in upright position has certain advantages which cannot be overrated.

By reference to Figs. 13 to 15 it will be seen that the punches 15 are slightly larger than the center bore of the nut blanks. Upon the descending movement of the punch the latter, by reason of its width, will force the wall outwardly, thus breaking the texture thereof. The subsequent horizontal movement of the punch and the cutting of the slot are thus facilitated. In other words, the punching operation is resolved into two distinct steps comprising, first, the breaking of the texture of the nut wall, and, second, the punching operation proper.

The possibility of employing punches larger than the center bore of the nut blanks furthermore is a desirable feature, as thereby the life of a punch is prolonged as compared with small punches, which soon give out. It is needless to add that the maintaining of the nut blanks in upright position insures for the same a large contacting surface on the bottom, and provides thus for stability.

In the drawings the preferred embodiment of the invention is shown, which is merely indicative of the principle on which the invention is predicated. No intention prevails of restricting the invention to the details of construction shown, nor to the arrangement of parts. Various changes, alterations, and modifications will suggest themselves to those versed in this particular art and I therefore claim my invention as broadly as the state of the art will permit.

I claim:

1. In a machine of the class described, means for supporting nut blanks in upright position to provide a stable arrangement thereof, a punch, and means for guiding said punch into the center bore of the nut and outwardly through the nut wall.

2. In a machine of the class described, means for supporting nut blanks in upright position to provide a stable arrangement thereof, and a punch adapted to put slots in the nut wall from the center bore outwardly.

3. In a machine of the class described, means for supporting a nut blank in upright position, and means reciprocating in vertical and subsequently in horizontal direction for castellating nut blanks from the center bore outwardly.

4. In a machine of the class described, means for supporting a nut blank in upright position, and means reciprocating in a devious path having a rectilinear termination for castellating the nut blank from the center bore outwardly.

5. In a machine of the class described, means for supporting a nut blank in upright position, and vertically reciprocating means adapted to execute a horizontal motion at a predetermined position to punch slots in the wall of the nut blank.

6. In a machine of the class described, means for holding a nut blank in upright position, and means executing a vertical movement and a horizontal movement after entering the nut bore to punch slots in the wall of the nut blank.

7. In a machine of the class described, means for holding nut blanks in upright position to form a stable arrangement thereof, and vertically reciprocating means for punching the walls of the nut blank from the center bore outwardly.

8. In a machine of the class described, means for holding nut blanks in upright position to form a stable arrangement thereof, and means for castellating the nut blanks from the center bore outwardly.

9. In a machine of the class described, means for holding nut blanks in upright position to form a stable arrangement thereof, and vertically reciprocating means for castellating the nut blank.

10. In a machine of the class described, means for conveying nut blanks in upright position in spaced relation through a path, and means for castellating the nut blank.

11. In a machine of the class described, means for supporting a nut blank in upright position, a reciprocating element, and means movably secured to said element for slotting the nut blanks from the center outwardly.

12. In a machine of the class described, means for supporting a nut blank in upright position, a reciprocating element, and means pivotally secured to said element for slotting the nut blanks from the center outwardly.

13. In a machine of the class described, means for supporting a nut blank in upright position, a reciprocating element, and means secured to said element to intermittently participate in the movement of said element and alternately move relatively thereto for slotting the nut blanks from the center outwardly.

14. In a machine of the class described, means for supporting a nut blank in upright position, a reciprocating element, and means secured to said element to move transversely of said element for slotting the nut blanks from the center outwardly.

15. In a machine of the class described, means for supporting a nut blank in upright position, a reciprocating element, means pivotally secured by links to said element and adapted to slot the nut blank from the center outwardly, and means for causing movement of said pivotally secured means with respect to said element.

16. In a machine of the class described, means for supporting a nut blank in upright position, a reciprocating element, means secured by a plurality of links to said element and adapted to slot the nut blank from the center outwardly, and stationary means for causing actuation of said slotting means.

17. In a machine of the class described, means for supporting a nut blank in upright position, a reciprocating element, and means secured by a plurality of parallel links to said element and adapted to slot the nut blank from the center outwardly.

18. In a machine of the class described, means for supporting a nut blank in upright position, a vertically reciprocating element, and means secured to said element to move at right angles thereto for slotting the nut blanks from the center bore outwardly.

19. In a machine of the class described, means for supporting a nut blank in upright position, a vertically reciprocating element, and means secured to move transversely to said element for slotting the nut blanks from the center bore outwardly.

20. In a machine of the class described, means for supporting a nut blank in upright position, a vertically reciprocating element, and means secured to said element to be capable of an independent horizontal movement for slotting the nut blanks from the center bore outwardly.

21. In a machine of the class described, means for supporting a nut blank, a vertically reciprocating element, and means secured to said element to be capable of an independent rectilinear movement for slotting the nut blanks from the center bore.

22. In a machine of the class described, means for supporting a nut blank in upright position, a vertically reciprocating element, a punch movably secured to said element, and means for causing said punch to move relatively to said element to thereby slot the wall of the nut blank.

23. In a machine of the class described, means for supporting a nut blank in upright position, a reciprocating element, a punch movably secured thereto, and means for causing said punch to move relatively to said element at a predetermined position to thereby slot the wall of the nut blank.

24. In a machine of the class described, means for supporting a nut blank in upright position, a reciprocating element, a punch movably secured thereto and adapted to enter the center bore of the nut blank, and means for causing relative movement between said element and punch after the latter's entry into the nut bore to thereby slot the wall of the nut blank.

25. In a machine of the class described, means for supporting a nut blank in upright position, a reciprocating element, a punch movably secured thereto and adapted to enter the center bore of the nut blank, and stationary means for causing relative movement between said punch and element after the punch has entered the nut bore a predetermined distance.

26. In a machine of the class described, means for supporting a nut blank in upright position, a reciprocating element, a punch movably secured thereto and adapted to enter the center bore of the nut blank, and an abutment deflecting the punch from the vertical movement to a movement under an angle thereto to slot thereby the nut blank.

27. In a machine of the class described, a reciprocating element, a plurality of punches secured to said element to alternately move therewith and independently thereto, means for supporting a plurality of nut blanks in upright position and in vertical registry with said punches, and means for causing said punches to simultaneously move relative to said element subsequent to their entry into the bores of the nut blanks.

28. In a machine of the class described, a vertically reciprocating element, a holder secured to said element to permit a parallel movement of the holder, a plurality of punches disposed in said holder, means for supporting a plurality of nut blanks in upright position and in registry with said punches, and means engaging said holder for arresting its participation in the vertical movement of said element and producing horizontal movement of the holder subsequent to the entry of the punch into the center bore of the nut blanks.

29. In a machine of the class described, a vertically reciprocating element, a holder having a plurality of punches, a plurality of links pivotally secured to said element and to said holder, means for supporting a plurality of nut blanks in upright position and in registry with said punches, and means engaging said holder to produce relative movement between said holder and reciprocating element subsequent to the entry of the punches into the center bore of the nut blanks.

30. In a machine of the class described, means for conveying nut blanks in upright position in spaced relation through a path assigned thereto, and means for slotting the nut blanks from the center bore outwardly.

31. In a machine of the class described, means for intermittently advancing nut blanks in upright position in spaced relation through a path assigned thereto, and means for slotting the nut blanks from the center bore outwardly.

32. In a machine of the class described, horizontally reciprocating means for indexing and conveying nut blanks in upright position in spaced relation through a path assigned thereto, and means for slotting the nut blanks.

33. In a machine of the class described, a die having a guide groove, means for singly conveying nut blanks in upright position in operative relation to said die, and means for slotting the nut blanks and discharging the slugs through said guide groove.

34. In a machine of the class described, means for intermittently indexing and conveying nut blanks in upright position and in spaced relation through a path assigned thereto, and means for slotting the nut blanks from the center bore outwardly.

35. In a machine of the class described, a bearing plate, means for indexing and conveying nut blanks in upright position on said bearing plate, and means for slotting the nut blanks from the center bore outwardly.

36. In a machine of the class described, means for conveying nut blanks, and means for slotting the nut blanks from the center bore outwardly, said conveying means being adapted to index the nut blanks.

37. In a machine of the class described, reciprocating means for indexing and conveying nut blanks in upright position through a path assigned thereto, and means for slotting the nut blanks, said slotting means actuating said reciprocating means.

38. In a machine of the class described, reciprocating means for indexing and conveying nut blanks in spaced relation through a path assigned thereto, and means for slotting the nut blanks.

39. In a machine of the class described, an element for conveying nut blanks in upright position through a path assigned thereto to afford a stable arrangement for said blanks, and means for slotting the nut blanks from the center bore outwardly.

40. In a machine of the class described, a reciprocating element adapted to feed nut blanks in upright position through a path assigned thereto to afford a stable arrangement for said blanks, and means reciprocating at right angles and parallel to said element for slotting the nut blanks from the center bore outwardly.

41. In a machine of the class described, horizontally reciprocating means for indexing and conveying nut blanks through a path assigned thereto, and means for slotting the nut blanks.

42. In a machine of the class described, horizontally reciprocating means for indexing and conveying spaced nut blanks in upright position through a path assigned thereto, and means for slotting the nut blanks.

43. In a machine of the class described, a horizontally reciprocating element for singly conveying nut blanks in upright position through a path assigned thereto to afford a stable arrangement for said blanks, and means for slotting the nut blanks, said means reciprocating parallel to said element for a portion of their movement.

44. In a machine of the class described, horizontally reciprocating means for indexing and conveying nut blanks in upright position through a path assigned thereto, and means reciprocating in a devious path having a rectilinear termination for slotting the nut blanks.

45. In a machine of the class described, a stationary die, an element defining with said die a path for the conveyance of nut blanks, and means for feeding the nut blanks in spaced relation through said path in upright position.

46. In a machine of the class described, a die, an element defining with said die a path for the movement of nut blanks, and means for indexing and feeding the nut blanks in spaced relation through said path in upright position.

47. In a machine of the class described, a stationary die, an element defining with said die a path for the feeding of said nut blanks, means for feeding the nut blanks through said path in upright position and in spaced relation, and means for slotting the nut blanks.

48. In a machine of the class described, a stationary die, a movable element defining with said die a path for the feeding of nut blanks, means for feeding the nut blanks through said path in upright position and in spaced relation, and means for slotting the nut blanks.

49. In a machine of the class described, a stationary die, a horizontally movable element defining with said die a path for the feeding of nut blanks, means for feeding the nut blanks through said path in upright position and in spaced relation, and means for slotting the nut blanks.

50. In a machine of the class described, a stationary die, a horizontally reciprocating element defining with said die a path for the feeding of nut blanks, means for indexing and feeding the nut blanks through said path in upright position, and means for slotting the nut blanks from the center bore outwardly.

51. In a machine of the class described, a stationary die, a horizontally reciprocating element defining with said die a path for the conveyance of nut blanks, means secured to said element for indexing and feeding the nut blanks through said path in upright position, and means for slotting the nut blanks from the center bore outwardly.

52. In a machine of the class described, a stationary die, a horizontally reciprocating element defining with said die a path for the feeding of nut blanks, means movably secured to said element for indexing and feeding the nut blanks through said path in upright position, and means for slotting the nut blanks from the center bore outwardly.

53. In a machine of the class described, a stationary die, a horizontally reciprocating element defining with said die a path for the feeding of nut blanks, means pivotally secured to said element for indexing and feeding the nut blanks through said path in upright position, and means for slotting the nut blanks from the center bore outwardly.

54. In a machine of the class described, a stationary die, a horizontally reciprocating element defining with said die a path for the feeding of nut blanks, spring-controlled means secured to said element for indexing and feeding the nut blanks through said path in upright position, and means for slotting the nut blanks from the center bore outwardly.

55. In a machine of the class described, means for maintaining nut blanks in upright position, a reciprocating punch for slotting the nut blanks from the center outwardly, and means for indexing and feeding the nut blanks in upright position on the reciprocation of said punch.

56. In a machine of the class described, a stationary die, a movable element defining with said die a path for the feeding of nut blanks, a reciprocating punch for slotting the nut blanks from the center outwardly, and means for indexing and feeding the nut blanks in upright position on the reciprocation of said punch.

57. In a machine of the class described, a stationary die, a reciprocable element defining with said die a path for the indexing and feeding of nut blanks in upright position, a vertically reciprocating punch for slotting the nut blanks from the center outwardly, and means for indexing and feeding the nut blanks on the reciprocation of said punch.

58. In a machine of the class described, a stationary die, a reciprocable element defining a path including narrow and wide portions for the feeding and indexing of nut blanks in upright position, a reciprocating punch for slotting the nut blanks from the center bore outwardly, and means for indexing and feeding the nut blanks on the reciprocation of said punch.

59. In a machine of the class described, a stationary die, an element reciprocating at a constant distance from the front edge of said die and defining therewith a permanent path for the feeding and indexing of the nut blanks, a reciprocating punch for slotting the nut blanks from the center outwardly, and means for indexing and feeding the nut blanks on the reciprocation of said punch.

60. In a machine of the class described, a stationary die, a horizontally reciprocating element defining with said die a path for the feeding of nut blanks, a plurality of pawls secured to said element and adapted to index and advance the nut blanks in said path in upright position, and means for slotting the nut blanks from the center bore outwardly.

61. In a machine of the class described, a stationary die, an element moving horizontally in a cyclic motion and defining with said die a path for the feeding of nut blanks, a plurality of pawls pivotally secured to said element and adapted to engage the nut blanks for indexing and advancing the same a predetermined distance in said path in upright position, and means for slotting the nut blanks.

62. In a machine of the class described, a stationary die, a horizontally reciprocating element defining with said die a path including narrow and wide portions for the feeding and indexing of nut blanks in upright position, a plurality of pawls pivotally secured to said element and constructed to engage a corner of the nut blanks and force the same in engagement with the pawls to participate in their movement, and means for slotting the nut blanks from the center bore outwardly.

63. In a machine of the class described, a stationary die, a horizontally reciprocating element defining with said die a path including narrow and wide portions for the feeding and indexing of nut blanks, a plurality of spring-controlled pawls pivoted on said element and adapted to turn the nut blanks to be arranged between said die and pawls, said pawls having lugs to carry along the nut blanks, and means for slotting the nut blanks from the center bore outwardly.

64. In a machine of the class described, a stationary die, a horizontally reciprocating element defining with said die a path including narrow and wide portions for the feeding and indexing of nut blanks in upright position, means secured to said element for turning the nut blanks in said wide path portions into position for movement in said narrow path portions, shoulders on said means for advancing the nut blanks, and a punch for slotting the nut blanks from the center bore outwardly.

65. In a machine of the class described, a stationary die, a horizontally reciprocating element defining with said die a path comprising narrow and wide portions, pawls pivotally secured to said element and provided with a plurality of shoulders for turning and advancing the nut blanks upon movement of said element, and means for slotting the nut blanks from the center bore outwardly.

66. In a machine of the class described, means reciprocating vertically and horizontally for slotting nut blanks held in upright position from the center bore outwardly.

67. In a machine of the class described, means for indexing and conveying nut blanks in upright position through a path assigned thereto, means for securing the nut blanks in position to be operated on, and means for slotting the nut blanks from the center bore outwardly.

68. In a machine of the class described, means for indexing and conveying nut blanks in upright position through a path assigned thereto, means for engaging the sides of the nut blanks to lock the same in position to be operated on, and means for slotting the nut blanks.

69. In a machine of the class described, means for intermittently indexing and advancing nut blanks in upright position through a path assigned thereto, means for simultaneously securing a plurality of nut blanks in position to be operated on, and means for slotting the nut blanks from the center bore outwardly.

70. In a machine of the class described, means for intermittently indexing and advancing nut blanks in upright position through a path assigned thereto, means acting on said first named means for securing the nut blanks in position to be operated on, and means for slotting the nut blanks from the center bore outwardly.

71. In a machine of the class described, means for intermittently indexing and advancing nut blanks in upright position through a path assigned thereto, means acting on said first named means for securing the nut blanks in position to be operated on, and means for slotting the nut blanks from the center outwardly, said last named means actuating said nut securing means.

72. In a machine of the class described, a reciprocating element adapted to index and feed nut blanks in upright position through a path assigned thereto, means for forcing said element into nut-engaging position, and means for slotting the nut blanks from the center bore outwardly.

73. In a machine of the class described, a horizontally reciprocating element adapted to index and feed nut blanks in upright position through a path assigned thereto, means for moving said element at right angles to its reciprocatory movement to engage the nut blanks, and means for slotting the nut blanks from the center bore outwardly.

74. In a machine of the class described, a longitudinally ricprocating element adapted to index and feed nut blanks in upright position through a path assigned thereto, a plurality of slide blocks adapted to shift said element transversely, and means for slotting the nut blanks from the center bore outwardly.

75. In a machine of the class described, reciprocating means for indexing and conveying nut blanks in upright position through a path assigned thereto, a reciprocating element, and means pivotally secured to said element for slotting the nut blanks from the center outwardly.

76. In a machine of the class described, reciprocating means for indexing and conveying nut blanks in upright position through a path assigned thereto, a vertically reciprocating element, a punch movably secured thereto, and means for causing said punch to move relatively to said element to thereby slot the wall of the nut blank.

77. In a machine of the class described, a stationary die, a horizontally reciprocating member defining with said die a path for the indexing and feeding of nut blanks, means secured to said member for indexing and feeding the nut blanks in upright position, a vertically reciprocating element, and a punch movably secured to said element, said die causing the punch to move relatively to said element to thereby slot the wall of the nut blank.

78. In a machine of the class described, a stationary die, a horizontally reciprocating member defining with said die a path for the indexing and feeding of nut blanks in upright position, a plurality of pawls pivotally secured to said member and adapted to engage the nut blanks for indexing and advancing the same, a vertically reciprocating element, and a punch movably secured to said element, said die causing said punch to move relatively to the element to thereby slot the nut blanks from the center bore outwardly.

79. In a machine of the class described, a stationary die, a horizontally reciprocating member defining with said die a path comprising wide and narrow portions for the indexing and feeding of nut blanks in upright position, pawls pivotally secured to said member and adapted to engage the nut blanks for indexing and advancing the same, a vertically reciprocating element, and a punch movably secured to said element, said die deflecting said punch from the vertical into horizontal movement after the punch has entered the nut bore a predetermined distance.

80. In a machine of the class described, a die, a horizontally reciprocating member defining with said die a path for the indexing and feeding of nut blanks in upright position, means secured to said member for indexing and feeding the nut blanks in said path, a vertically reciprocating element, a punch movably secured to said element, said die causing the punch to move relatively to said element to thereby slot the wall of the nut blanks, and means for securing the nut blanks during the slotting operation.

81. In a machine of the class described, a die, a horizontally reciprocating member defining with said die a path for the indexing and feeding of nut blanks in upright position, means secured to said member for indexing and feeding the nut blanks in said path, a vertically reciprocating element, a punch movably secured to said element, said die causing the punch to move relatively to said element to thereby slot the wall of the nut blanks, and means actuated by said vertically reciprocating element for securing the nut blanks during the slotting operation.

82. In a machine of the class described, a die, a horizontally reciprocating member defining with said die a path for the indexing and feeding of nut blanks in upright position, means secured to said member for indexing and feeding the nut blanks in said path, a vertically reciprocating element, a punch movably secured to said element, said die causing the punch to move relatively to said element to thereby slot the wall of the nut blanks, and means for moving said member at right angles to its reciprocating movement into engagement with the nut blanks.

83. In a machine of the class described, a die, a horizontally reciprocating member defining with said die a path for the indexing and feeding of nut blanks in upright position, means secured to said member for indexing and feeding the nut blanks in said path, a vertically reciprocating element, a punch movably secured to said element, said die causing the punch to move relatively to said element to thereby slot the wall of the nut blanks, and a plurality of slide blocks adapted to shift said member transversely to its reciprocating movement, said vertically reciprocating element being adapted to actuate said slide blocks.

84. In a machine of the class described, a die, a horizontally reciprocating member defining with said die a path comprising wide and narrow portions for the indexing and feeding of nut blanks in upright position, pawls pivotally secured to said member and adapted to engage the nut blanks for indexing and advancing the same, a vertically reciprocating element, a punch movably secured to said element, said die deflecting said punch from the vertical into horizontal movement after the punch has entered the nut bore a predetermined distance, and slide blocks adapted to shift said member transversely to its reciprocating movement, said vertically reciprocating element being adapted to actuate said slide blocks.

85. In a machine of the class described, means for conveying nut blanks through a path assigned thereto, and means for preventing operation of said conveying means upon improper arrangement of a nut blank in said path.

86. In a machine of the class described, means for conveying nut blanks through a path assigned thereto, and automatic means for preventing operation of said conveying means upon improper arrangement of a nut blank in said path.

87. In a machine of the class described, means for conveying nut blanks through a path assigned thereto, and means for arresting said conveying means at a predetermined position upon improper arrangement of a nut blank in said path.

88. In a machine of the class described, means for conveying nut blanks through a path assigned thereto, and means acting on said conveying means upon improper location of a nut blank for shortening operation of said conveying means.

89. In a machine of the class described, means for indexing and conveying nut blanks in upright position through a path assigned thereto, and means entering in a recess of said conveying means to reduce its operative movement upon improper arrangement of a nut blank in said path.

90. In a machine of the class described, a reciprocating element adapted to index and convey nut blanks through a path assigned thereto, and means for stopping the reciprocation of said element intermediate its end positions upon improper arrangement of a nut blank in said path.

91. In a machine of the class described, a reciprocating member having a cut out portion and adapted to index and convey nut blanks through a path assigned thereto, and means entering the cut out portions of said member upon improper arrangement of a nut blank in said path.

92. In a machine of the class described, a reciprocating member adapted to index and convey nut blanks to be successively operated on, means for slotting the nut blanks from the center bore outwardly, and means for shortening reciprocation of said member upon improper arrangement of said nut blanks.

93. In a machine of the class described, a die, a reciprocating member defining with said die a path for the indexing and conveying of nut blanks, said reciprocating member being adapted to successively index and advance the nut blanks, and means for shortening operation of said member upon the latter's displacement by an improperly arranged nut.

94. In a machine of the class described, a die, a reciprocating member defining with said die a path comprising narrow and wide portions for respectively advancing and indexing nut blanks, means secured to said reciprocating member for advancing and indexing nut blanks, means for slotting the nut blanks while in the wider path portions, and means for shortening reciprocation of said member upon a nut blank remaining in a narrow path portion during the operative movement of said slotting members.

95. In a machine of the class described, a die, a reciprocating member defining with said die a path comprising narrow and wide portions in which nut blanks are advanced and indexed respectively, means secured to said reciprocating member for advancing and indexing nut blanks, means for slotting the nut blanks while in the wider path portions, and means for shortening the reciprocation of said member upon the latter being spaced more than a normal distance from the die.

96. In a machine of the class described, a die, a reciprocating member having a recess and defining with said die a path comprising narrow and wide portions in which nut blanks are advanced and indexed respectively, means pivotally secured to said reciprocating member for advancing and indexing nut blanks, means for slotting the nut blanks while in the wider path portions, and an abutment adapted to enter the recess of the member upon the latter being shifted away from the die.

97. In a machine of the class described, means for conveying nut blanks through a path assigned thereto, means for slotting the nut blanks, and means for preventing operation of said slotting means upon improper positioning of the nut blanks.

98. In a machine of the class described, means for conveying nut blanks through a path assigned thereto, means for slotting the nut blanks, and automatic means for preventing operation of said slotting means upon improper positioning of the nut blanks.

99. In a machine of the class described, means for conveying nut blanks in upright position through a path assigned thereto, vertical reciprocating means for slotting the nut blanks, and automatic means for shortening the reciprocation of said slotting means upon improper positioning of the nut blanks.

100. In a machine of the class described, means for horizontally conveying nut blanks in upright position through a path assigned thereto, a vertical reciprocating element, punches movably secured thereto, means for causing the punches to move relative to said element to thereby slot the nut blanks from the center bore outwardly, and means for preventing complete descent of said punches upon improper positioning of the nut blanks.

101. In a machine of the class described, means for horizontally conveying nut blanks in upright position through a path assigned thereto, a vertical reciprocating element, punches movably secured thereto, means for causing the punches to move relative to said element to thereby slot the nut blanks from the center bore outwardly, and means set in action by an improperly located nut blank to prevent operation of the punches.

102. In a machine of the class described, means for conveying nut blanks through a path assigned thereto, means for slotting the nut blanks, and means on said conveying means for shortening the movement of said conveying and slotting means upon improper positioning of a nut blank.

103. In a machine of the class described, means for conveying nut blanks through a path assigned thereto, means for slotting the nut blanks, and a pin secured to said conveying means and adapted to prevent movement of said slotting means upon improper positioning of a nut blank.

104. In a machine of the class described, means for conveying nut blanks in upright position through a path assigned thereto, means for slotting the nut blanks from the center bore outwardly, means for preventing actuation of the conveying means upon improper arrangement of a nut blank, and means for preventing operation of said slotting means upon improper arrangement of a nut blank.

105. In a machine of the class described, an element for conveying nut blanks in upright position through a path assigned thereto, vertically reciprocating punches for slotting the nut blanks from the center bore outwardly, means set in action by an improperly located nut blank for rendering idle the operation of said conveying element, and means actuated by said last named means for preventing operation of said punches.

106. In a machine of the class described, a die, a reciprocating member defining with said die a path for the indexing and advancing of nut blanks, vertically reciprocating punches for slotting the nut blanks from the center bore outwardly, an abutment preventing complete reciprocation of said member upon the latter being at an abnormal distance from said die, and means actuated by said member when at an abnormal distance for preventing operation of said punches.

107. In a machine of the class described, a series of operating tools, means reciprocating in a horizontal plane in longitudinal and transverse directions and means arranged thereon for intermittently indexing and advancing nut blanks to successive operating tools.

108. In a machine of the class described, a series of operating tools, means moving in a closed path and means arranged thereon for intermittently indexing and advancing nut blanks to successive operating tools.

109. In a machine of the class described, a die, a horizontally reciprocating member defining with said die a path for the indexing and feeding of nut blanks in upright position, means secured to said member for indexing and feeding the nut blanks in said path, a vertically reciprocating element, a punch movably secured to said element, said die causing the punch to move relatively to said element to thereby slot the wall of the nut blanks, means actuated by said vertically reciprocating element for securing the nut blanks in position to be operated on, and means actuated by an improperly located nut blank for preventing operation of said reciprocating member.

110. In a machine of the class described, means for supporting nut blanks in upright position to form a stable arrangement thereof, and means for initially breaking the texture of the nut wall and subsequently slotting the nut blank from the center bore outwardly.

111. In a machine of the class described, means for supporting a nut blank in upright position, and means reciprocating in vertical and horizontal position to break the texture of the nut wall and slot the nut blank from the center bore outwardly.

112. In a machine of the class described, means for supporting a nut blank in upright position, and a punch adapted to initially break the texture of the nut wall prior to slotting the same from the center bore of the nut blank outwardly.

113. In a machine of the class described, means for supporting a nut blank in upright position, and a punch wider than the center bore of the nut blank adapted to break the texture of the nut wall prior to slotting the nut blank from the center bore outwardly.

114. In a machine of the class described, means for supporting a nut blank in upright position, and a punch wider than the center bore of the nut blank moving in registry with the longitudinal axis of the blank and at right angles thereto to break the texture of the nut wall and subsequently cut a slot therein.

115. In a machine of the class described, means for supporting a nut blank in upright position, a punch wider than the center bore of the nut blank, and means for moving the punch vertically into the center bore to break the texture of the nut blank and subsequently moving said punch horizontally to cut a slot in the wall.

116. The combination with a blank holder, of a tool for cutting a kerf in a blank, said tool being mounted for movement in a devious path having a rectilinear termination.

117. The combination with a nut blank holder, of a tool for cutting a kerf in a blank, and means for moving said tool in a devious path having a rectilinear termination to cut a kerf from the center bore of the blank outwardly.

118. In a machine of the class described, means for supporting nut blanks, a punch, and means for moving the punch in registry with the longitudinal axis of the nut blank and at right angles thereto to cut a slot in the blanks.

119. In a machine of the class described, means for supporting a nut blank, a reciprocating element, and means secured to said element to intermittently participate in the movement of said element, and alternately move relatively thereto for slotting the nut blanks from the center outwardly.

120. In a machine of the class described, means for supporting a nut blank, a reciprocating element, and means secured to said element to move transversely to said element for slotting the nut blanks from the center outwardly.

121. In a machine of the class described, means for supporting a nut blank, a reciprocating element and punch secured by a plurality of links to said element and adapted to slot the nut blank from the center outwardly.

122. In a machine of the class described, means for supporting a nut blank, a reciprocating element and means secured to said element to be capable of a rectilinear movement independent of said element for slotting the nut blank from the center bore outwardly.

123. In a machine of the class described, means for supporting a nut blank, a reciprocating element, a punch movably secured to said element and means for causing said punch to move relatively to said element in a rectilinear direction to thereby slot the wall of the nut blank.

In witness whereof I affix my signature.

WALTER UMBDENSTOCK.